US012633459B2

(12) United States Patent
Yun et al.

(10) Patent No.:  US 12,633,459 B2
(45) Date of Patent:  May 19, 2026

(54) MULTILAYER CAPACITOR HAVING A DIELECTRIC LAYER WITH CORE-SHELL STRUCTURED DIELECTRIC GRAINS

(71) Applicant: SAMSUNG ELECTRO-MECHANICS CO., LTD., Suwon-si (KR)

(72) Inventors: Kimyoung Yun, Suwon-si (KR); Chanhee Nam, Suwon-si (KR); Heesun Chun, Suwon-si (KR); Yongwoo Bae, Suwon-si (KR); Mingon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 88 days.

(21) Appl. No.: 18/663,748

(22) Filed: May 14, 2024

(65) Prior Publication Data

US 2025/0069809 A1    Feb. 27, 2025

(30) Foreign Application Priority Data

Aug. 23, 2023    (KR) ........................ 10-2023-0110474

(51) Int. Cl.
H01G 4/12       (2006.01)
H01G 4/30       (2006.01)
(52) U.S. Cl.
CPC ............. H01G 4/1227 (2013.01); H01G 4/30 (2013.01)
(58) Field of Classification Search
None
See application file for complete search history.

(56) References Cited

U.S. PATENT DOCUMENTS

2012/0238438 A1    9/2012    Endo et al.
2014/0098455 A1    4/2014    Kang et al.
(Continued)

FOREIGN PATENT DOCUMENTS

JP        2012-193072 A    10/2012
JP        2016-115876 A     6/2016
(Continued)

OTHER PUBLICATIONS

Korean Office Action dated Jul. 9, 2024 issued in Korean Patent Application No. 10-2023-0110474 (with English translation).
(Continued)

*Primary Examiner* — Eric W Thomas
(74) *Attorney, Agent, or Firm* — Morgan, Lewis & Bockius LLP

(57)        ABSTRACT

A multilayered capacitor according to an embodiment includes a capacitor body that includes a dielectric layer and an internal electrode, and an external electrode that are disposed on the outside of the capacitor body, and the dielectric layer contain a plurality of dielectric grains containing a major component and a minor component, and at least one of the plurality of dielectric grains has a core-shell structure including a core, a shell, and a core-shell wall positioned between the core and the shell, and between at least two dielectric grains of the plurality of dielectric grains, a grain boundary is included, and when the average concentration of the minor component in the grain boundary is denoted by $C_{GB}$ (at %) and the average concentration of the minor component in the core-shell wall is denoted by $C_{CS}$ (at %), $C_{CS}/C_{GB}$ is in a range from 0.40 to 0.75.

20 Claims, 10 Drawing Sheets

(56)            References Cited

U.S. PATENT DOCUMENTS

| | | | |
|---|---|---|---|
| 2016/0086735 A1 | 3/2016 | Yoon et al. | |
| 2018/0308637 A1* | 10/2018 | Nishigaki | ............. C04B 41/009 |
| 2020/0039887 A1 | 2/2020 | Ariizumi et al. | |
| 2021/0159013 A1* | 5/2021 | Chun | ................... H01G 4/1218 |
| 2022/0399165 A1 | 12/2022 | Kim et al. | |

FOREIGN PATENT DOCUMENTS

| | | |
|---|---|---|
| JP | 2020-021820 A | 2/2020 |
| KR | 10-2016-0034763 A | 3/2016 |
| KR | 10-2019-0019975 A | 2/2019 |
| KR | 10-2022-0167599 A | 12/2022 |

OTHER PUBLICATIONS

G. Y. Yang et al., "Oxygen nonstoichiometry and dielectric evolution of BaTiO3. Part I-improvement of insulation resistance with reoxidation," Journal of Applied Physics, vol. 96, 2004, pp. 7492-7499.
Korean Notice of Allowance dated Sep. 12, 2024 issued in Korean Patent Application No. 10-2023-0110474 (with English translation).

* cited by examiner

FIG. 3

MULTILAYER CAPACITOR HAVING A DIELECTRIC LAYER WITH CORE-SHELL STRUCTURED DIELECTRIC GRAINS

CROSS-REFERENCE TO RELATED APPLICATION

This application claims priority to and the benefit of Korean Patent Application No. 10-2023-0110474 filed in the Korean Intellectual Property Office on Aug. 23, 2023, the entire contents of which are incorporated herein by reference.

TECHNICAL FIELD

The present disclosure relates to a multilayered capacitor.

BACKGROUND

Recently, as multi-functionalization and miniaturization of electronic devices have been rapidly progressing, miniaturization and performance improvement of electronic components have also been progressing at a rapid pace. Further, the demand for high reliability of electric devices for use in automobiles, network equipment, or the like and electronic components for use in industries has also been increasing significantly.

In order to meet such market demands, competition for technology development of passive components such as inductors, capacitors, or resistors has been accelerating. In particular, great effort has been required to dominate the market by developing various multilayer ceramic capacitor (MLCC) products whose applications and usage as passive components have been continuously increasing.

Further, MLCCs are capacitors made by stacking dielectric layers and internal electrodes, and are used in various electronic devices such as mobile phones, laptops, LCD TVs, etc. In particular, the demand for vehicles has increased with the development of the electronic control technology for automobiles, and as electronic devices for vehicles have become smaller and their functionality has improved, resistance to high temperature and moisture has been required for multilayered capacitors.

In general, the reliability of multilayered capacitors is secured by increasing the fraction of dielectric grain boundaries of a dielectric layer to secure insulation resistance. However, as capacitors have become thinner and their capacity has become higher, there is a limit to increasing the fraction of grain boundaries.

SUMMARY OF THE INVENTION

The present disclosure attempts to provide a capacitor with improved reliability by suppressing migration of electrons and ion carriers upon voltage application to prevent degradation of insulation resistance.

A multilayered capacitor according to an exemplary embodiment includes a capacitor body that includes a dielectric layer and an internal electrode, and an external electrode that are disposed on the outside of the capacitor body, and the dielectric layer contain a plurality of dielectric grains containing a major component and a minor component, and at least one of the plurality of dielectric grains has a core-shell structure including a core, a shell, and a core-shell wall positioned between the core and the shell, and between at least two dielectric grains of the plurality of dielectric grains, a grain boundary is included, and when the average concentration of the minor component in the grain boundary is denoted by $C_{GB}$ (at %) and the average concentration of the minor component in the core-shell wall is denoted by $C_{CS}$ (at %), $C_{CS}/C_{GB}$ is in a range from 0.40 to 0.75.

The ratio of the average diameter of the dielectric grain to the average diameter of the cores may be in a range from 1.2 to 1.8.

The ratio of the average number of dielectric grains including the core-shell wall to the average number of the dielectric grains may be equal to or greater than 70%.

The average diameter of the dielectric grain may be in a range from 120 nm to 200 nm.

The average diameter of the core may be in a range from 100 nm to 150 nm.

The average thickness of the dielectric layer is in a range from 0.05 μm to 0.5 μm.

The average thickness of the internal electrode may be in a range from 0.05 μm to 0.5 μm.

The major component may contain $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

The minor component may contain dysprosium (Dy), vanadium (V), manganese (Mn), chromium (Cr), silicon (Si), aluminum (Al), magnesium (Mg), tin (Sn), antimony (Sb), germanium (Ge), gallium (Ga), indium (In), barium (Ba), or a combination thereof.

The core-shell wall may contain an amount of minor component greater than 2.0 mol and equal to or smaller than 30.0 mol relative to 100 mol of the major component.

The shell may contain an amount of minor component greater than 0.1 mol and equal to or smaller than 30.0 mol relative to 100 mol of the major component, and the core may contain an amount of minor component equal to or smaller than 0.1 mol relative to 100 mol of the major component.

According to the multilayered capacitor of an embodiment, it is possible to provide a multilayered capacitor with improved reliability by suppressing migration of electrons and ion carriers upon voltage application to prevent degradation of insulation resistance.

BRIEF DESCRIPTION OF THE DRAWINGS

FIG. 3 is an exploded perspective view illustrating the stacking structure of internal electrodes layers in a capacitor body of FIG. 1.

DETAILED DESCRIPTION OF THE EMBODIMENTS

Figure 1:
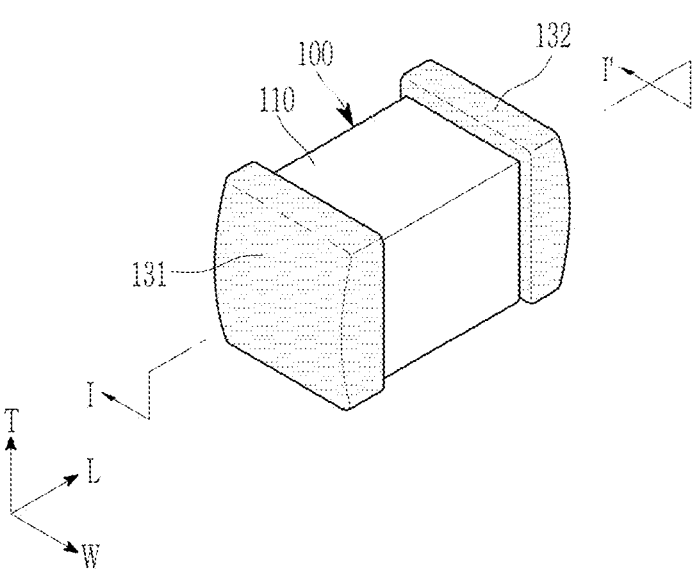
FIG. 1 is a perspective view illustrating a multilayered capacitor according to an embodiment.

Hereinafter, embodiments of the present invention will be described in detail with reference to the accompanying drawings such that those skilled in the art can easily implement them. The drawings and description are to be regarded as illustrative in nature and not restrictive. Like reference numerals designate like elements throughout the specification. Further, the accompanying drawings are provided for helping to easily understand embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element, or face the other constituent element, or intervening other constituent elements may be present. In contrast, when a constituent element is referred to as being "directly connected" or "directly coupled" to another constituent element, it will be appreciated that there are no intervening other constituent elements present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Accordingly, unless explicitly described to the contrary, the word "comprise", and variations such as "comprises" or "comprising", will be understood to imply the inclusion of stated elements but not the exclusion of any other elements.

Figure 2:
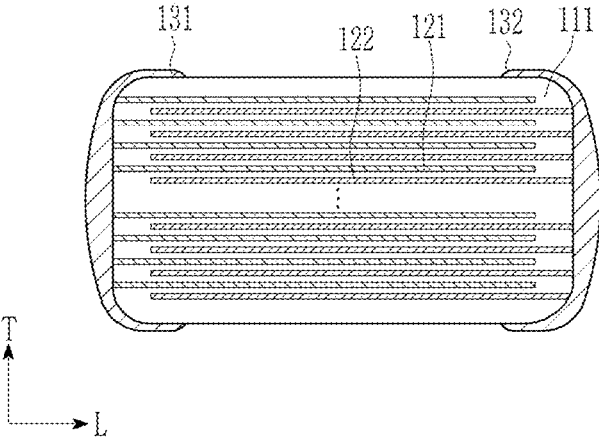
FIG. 2 is a cross-sectional view of the multilayered capacitor taken along line I-I' in FIG. 1.
Figure 3:
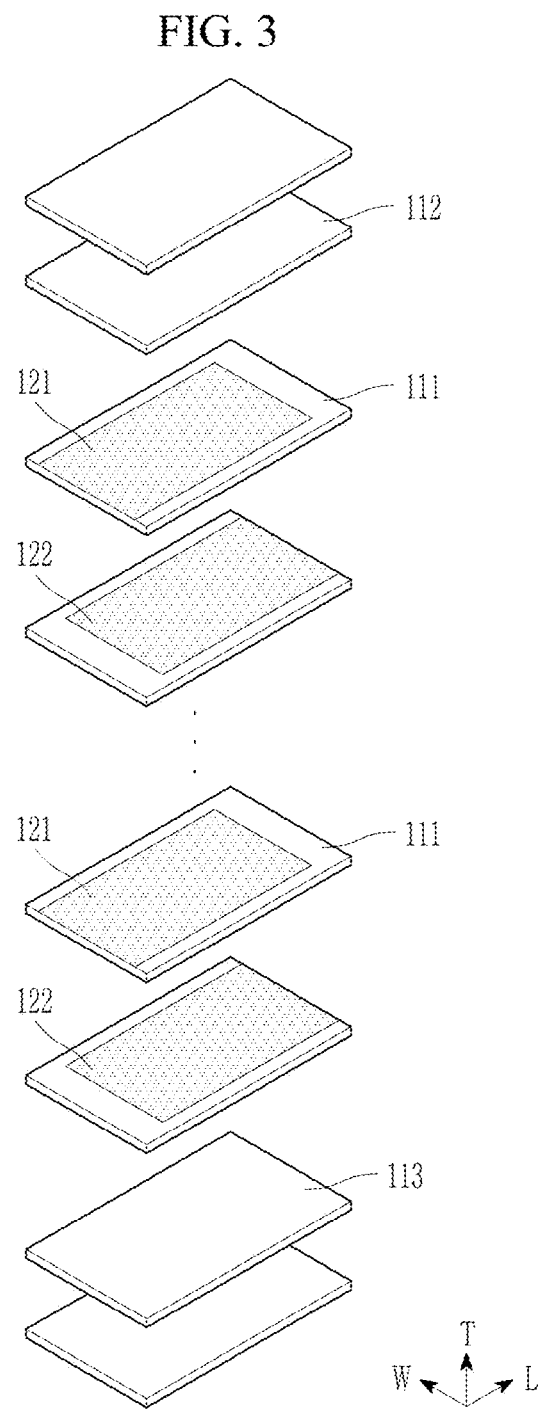

FIG. 1 is a perspective view illustrating a multilayered capacitor 100 according to an embodiment, and FIG. 2 is a cross-sectional view of the multilayered capacitor 100 taken along line I-I'in FIG. 1, and FIG. 3 is an exploded perspective view illustrating the stacking structure of internal electrodes in a capacitor body 110 of FIG. 1.

To clearly describe the present embodiment, directions are defined as follow: the L axis, the W axis, and the T axis shown in the drawings represent the longitudinal direction, width direction, and thickness direction of the capacitor body 110, respectively. Here, the thickness direction (T-axis direction) may be a direction perpendicular to wide surfaces (main surfaces) of sheet-shaped constituent elements, and may be used, for example, as the same concept as the stacking direction in which dielectric layers 111 are stacked. The length direction (L-axis direction) may be a direction extending in parallel with the wide surfaces (main surfaces) of the sheet-shaped constituent elements and be a direction appropriately perpendicular to the thickness direction (T-axis direction), and may be, for example, a direction in which a first external electrode 131 and a second external electrode 132 are positioned on both sides. The width direction (W-axis direction) may be a direction extending in parallel with the wide surfaces (main surfaces) of the sheet-shaped constituent elements and be a direction appropriately perpendicular to the thickness direction (T-axis direction) and the length direction (L-axis direction), and the lengths of the sheet-shaped constituent elements in the length direction (L-axis direction) may be longer than their lengths in the width direction (W-axis direction).

Referring to FIG. 1 to FIG. 3, the multilayered capacitor 100 according to the embodiment may include the capacitor body 110, and the first external electrode 131 and the second external electrode 132 that are disposed on both ends of the capacitor body 110 facing each other in the length direction (L-axis direction).

The capacitor body 110 may have, for example, an approximate hexahedral shape.

In the present embodiment, for ease of explanation, in the capacitor body 110, two surfaces facing each other in the thickness direction (T-axis direction) are defined as a first surface and a second surface, and two surfaces that are coupled to the first surface and the second surface and face each other in the length direction (L-axis direction) are defined as a third surface and a fourth surface, and two surfaces that are coupled to the first surface and the second surface, are coupled to the third surface and the fourth surface, and face each other in the width direction (W-axis direction) are defined as a fifth surface and a sixth surface.

As an example, the first surface which is the lower surface may be a surface oriented to the mounting direction. Further, the first surface to the sixth surface may be flat; however, the present embodiment is not limited thereto, and for example, the first surface to the sixth surface may be curved surfaces with convex center portions, and the border of each surface, i.e., the edge may be rounded.

The shape and dimensions of the capacitor body 110 and the number of dielectric layers 111 that are stacked are not limited to those shown in the drawings of the present embodiment.

The capacitor body 110 is formed by stacking a plurality of dielectric layers 111 in the thickness direction (T-axis direction) and baking them, and includes the plurality of dielectric layers 111, and first internal electrodes 121 and second internal electrodes 122 that are alternately disposed in the thickness direction (T-axis direction) with the dielectric layers 111 interposed therebetween.

In this case, adjacent dielectric layers 111 in the capacitor body 110 may be so integrated that it is difficult to see the boundaries between the dielectric layers without the use of a scanning electron microscope (SEM).

Further, the capacitor body 110 may include an active region and cover regions 112 and 113.

The active region is a portion that contributes to the formation of the capacity of the multilayered capacitor 100. As an example, the active region may be the region where the first internal electrodes 121 and the second internal electrodes 122 that are stacked along the thickness direction (T-axis direction) overlap.

The cover regions 112 and 113 are margin portions in the thickness direction, and may be positioned on the first surface side and second surface side of the active region in the thickness direction (T-axis direction). These cover regions 112 and 113 may be stacked on the upper surface and lower surface of the active region, respectively, and each may consist of a single dielectric layer 111 or two or more dielectric layers 111.

Also, the capacitor body 110 may further include side cover regions. The side cover regions are margin portions in the width direction, and may be positioned on the fifth surface side and sixth surface side of the active region in the width direction (W-axis direction), respectively. These side cover regions may be formed by applying a conductive paste layer for the internal electrodes on the surface of the dielectric green sheets, applying the conductive paste layers on only a part of the surface of the dielectric green sheets, and not applying the conductive paste layers on both sides of the surface of the dielectric green sheets, and then stacking the dielectric green sheets.

The cover regions 112 and 113 and the side cover regions serve to prevent damage to the first internal electrodes 121 and the second internal electrodes 122 by physical or chemical stress.

Figure 4:
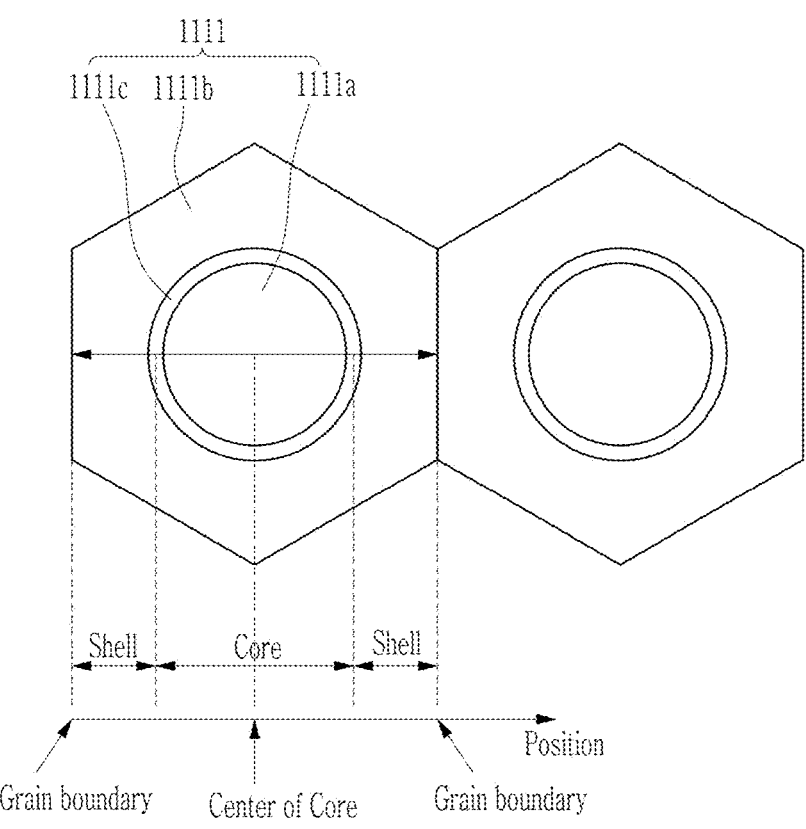
FIG. 4 is a drawing schematically illustrating the configuration of dielectric grains of dielectric layers.

FIG. 4 is a drawing schematically illustrating the configuration of dielectric grains 1111 of the dielectric layers 111.

The dielectric layers 111 includes a plurality of dielectric grains 1111.

Between at least two of the dielectric grains 1111, grain boundaries are included.

The dielectric grains 1111 contain a major component and a minor component.

The major component is the parent material of the dielectric, has a high dielectric constant, and contributes to the formation of the dielectric constant of the multilayered capacitor 100.

As an example, the major component may be a dielectric material containing $Ba_mTiO_3$ (wherein $0.995 \leq m \leq 1.010$), $(Ba_{1-x}Ca_x)_m(Ti_{1-y}Zr_y)O_3$ (wherein $0.995 \leq m \leq 1.010$, $0 \leq x \leq 0.10$, and $0 < y \leq 0.20$), $Ba_m(Ti_{1-x}Zr_x)O_3$ (wherein $0.995 \leq m \leq 1.010$ and $x \leq 0.10$), $(Ba_{1-x}Ca_x)_m(Ti_{1-y}Sn_y)O_3$ (wherein $0.995 \leq m \leq 1.010$, $0 \leq x \leq 0.10$ and $0 < y \leq 0.20$), or a combination thereof.

As an example, the major component may contain $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

As an example, the minor component may contain dysprosium (Dy), vanadium (V), manganese (Mn), chromium (Cr), silicon (Si), aluminum (Al), magnesium (Mg), tin (Sn), antimony (Sb), germanium (Ge), gallium (Ga), indium (In), barium (Ba), or a combination thereof.

Also, the minor component may further contain lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), hafnium (Hf), or a combination thereof.

For example, the dielectric grains 1111 may contain, as the minor component, 0.5 mol to 2.0 mol of $Dy_2O_3$, 0.1 mol to 0.5 mol of $Mn_3O_4$, 0.1 mol to 0.5 mol of $V_2O_5$, 0.2 mol to 1.0 mol of $BaCO_3$, 1.0 mol to 2.0 mol of $SiO_2$, 0.2 mol to 1.5 mol of $MgCO_3$, or 0.2 mol to 1.0 mol of $Al_2O_3$ relative to 100 mol of the major component. In this case, it is easy to make relative comparisons for dielectric changes.

There may be portions of the dielectric grains 1111 that are different in the molar ratio of the minor component relative to the major component, and as an example, at least one of the plurality of dielectric grains 1111 has a core-shell structure.

Each of the dielectric grains 1111 having core-shell structures includes a dielectric core 1111a, a shell 1111b that surrounds at least portion of the core 1111a, and a core-shell wall 1111c that is positioned between the core and the shell.

The core 1111a, the shell 1111b, and the core-shell wall 1111c are different in the molar ratio of the minor component relative to the major component, and for example, the molar ratio of the minor component relative to the major component may change rapidly at the boundary between the core 1111a and the shell 1111b, and as an example, the point where the molar ratio of the minor component relative to the major component is maximum may be included in the core-shell wall 1111c including the boundary between the core 1111a and the shells 1111b.

Accordingly, the boundary between the core 1111a and the shell 1111b may be easily recognized, and may be confirmed by transmission electron microscope-energy disperse X-ray spectrometer (TEM-EDX)

Figure 5:
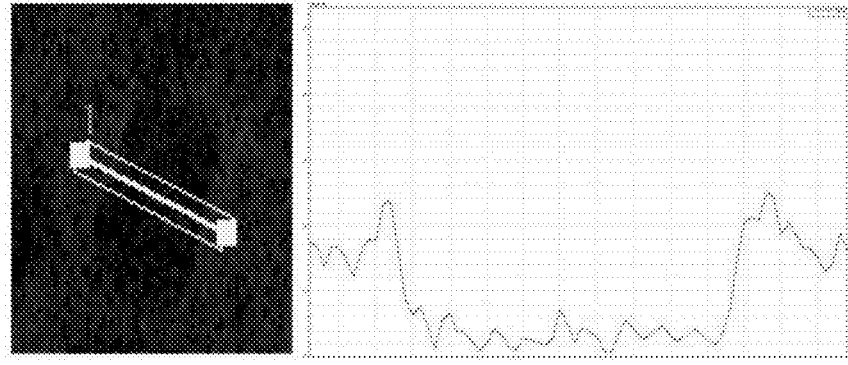
FIG. 5 shows a transmission electron microscope (TEM) image of a dielectric grain and a graph representing the result obtained by measuring the content of dysprosium (Dy) according to the position in the dielectric grain by energy disperse X-ray spectrometer (EDX).

FIG. 5 shows a transmission electron microscope (TEM) image of a dielectric grain and a graph representing the result obtained by measuring the content of dysprosium (Dy) that is the minor component according to the position in the dielectric grain by energy disperse X-ray spectrometer (EDX).

Referring to FIG. 5, when line analysis is carried out on the dielectric grains 1111 of the dielectric layers 111, positioned at the center of the active region in a cross section taken by cutting the center of the capacitor body 110 in the W-axis direction along the L-axis direction and the T-axis direction, with an energy disperse X-ray spectrometer (EDS) installed in a transmission electron microscope (TEM), in any one grain direction of a dielectric grain 1111 from the center of the core 1111a of the dielectric grain 1111, it is possible to distinguish the core 1111a and the shell 1111b by considering a portion where the total content of the minor component starts to increase rapidly as the boundary between the core 1111a and the shell 1111b.

Here, as the center of the core 1111a, the point at which the longest major axis and the shortest minor axis of minor axes orthogonal thereto meet may be determined. Further, energy disperse X-ray spectrometer (EDS) line analysis may be performed along the longest major axis passing through the center of the core 1111a of the dielectric grain 1111.

Alternatively, the core-shell wall 1111c including the boundary between the core 1111a and the shell 1111b or the boundary between the shell 1111b and the grain boundary may be defined by distinguishing different tones by a method such as binarizing the transmission electron microscope image.

Figure 6:
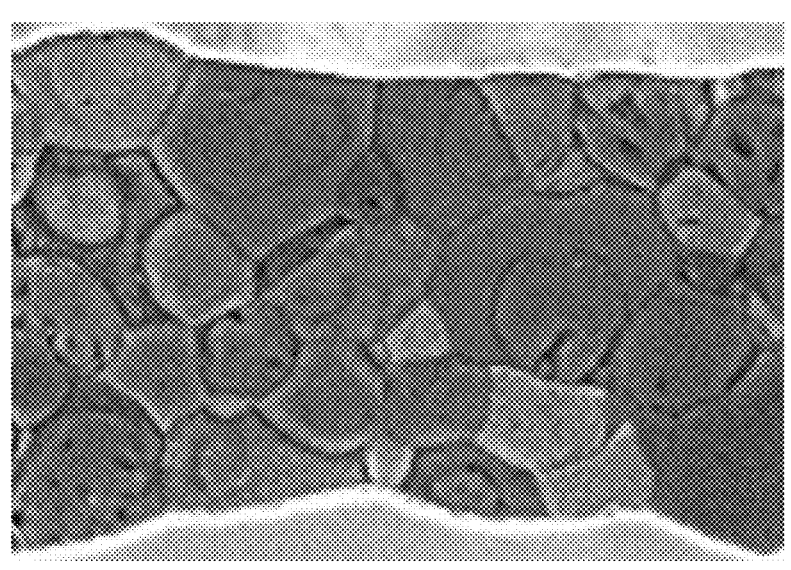
FIG. 6 is a scanning electron microscope (SEM) image obtained by observing dielectric grains of the dielectric layer with an SEM.
Figure 7:
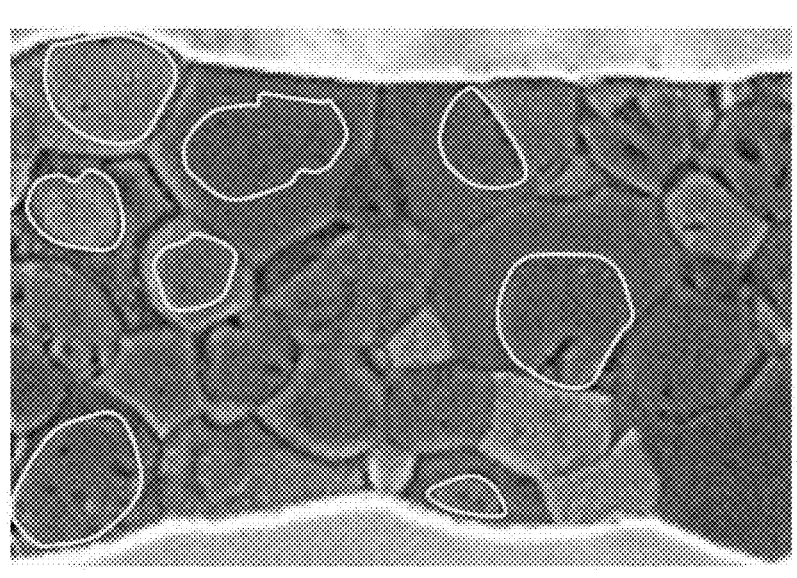
FIG. 7 is an image in which core-shell walls contained in the dielectric grains in FIG. 6 are marked.
Figure 8:
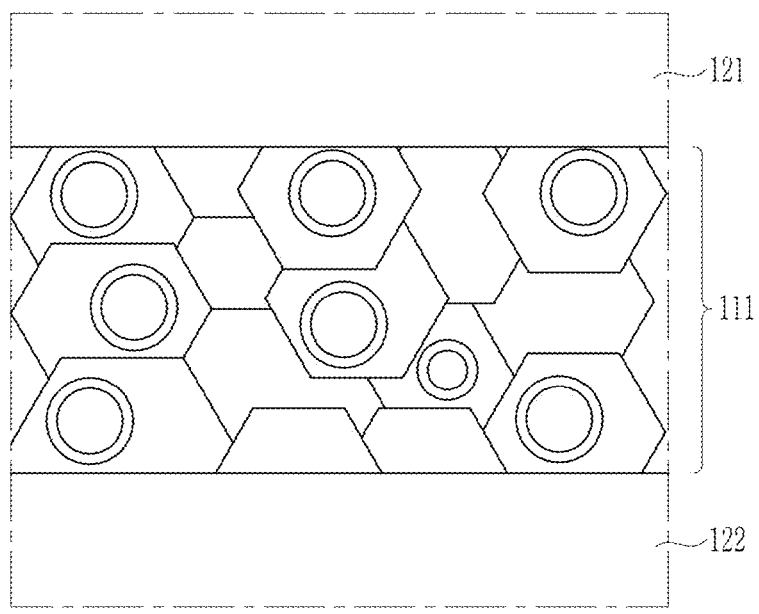
FIG. 8 is a drawing schematically illustrating a portion of a cross section of a multilayered capacitor containing dielectric grains containing core-shell walls.

FIG. 6 is a scanning electron microscope (SEM) image obtained by observing dielectric grains of the dielectric layer with an SEM, and FIG. 7 is an image in which core-shell walls contained in the dielectric grains in FIG. 6 are marked, and FIG. 8 is a drawing schematically illustrating a portion of a cross section of a multilayered capacitor containing dielectric grains containing core-shell walls.

The core-shell wall 1111c may include the boundary between the core 1111a and the shell 1111b, and as an example, the core-shell wall 1111c may include a point where the molar ratio of the minor component relative to the major component is maximum.

Referring to FIG. 6 and FIG. 7, the core-shell wall 1111c may correspond to a partial region with a dark tone in the dielectric grain in the dielectric layers in the scanning electron microscope (SEM) image of the dielectric grain.

Similar to the grain, the core-shell wall 1111c may serve as a barrier for suppressing migration of electrons and ion carriers when voltage is applied to the capacitor. Since the core-shell wall 1111c is in an unstable state with high energy, it can attract electrons and ion carriers to reach a stable energy state, thereby capable of suppressing migration of electrons and ion carriers. Therefore, it is possible to prevent the insulation resistance from being degraded, thereby effectively improving the reliability of the capacitor. Accordingly, the dielectric grains 1111 include core-shell walls 1111c, it is possible to effectively improve the reliability of the capacitor without additionally increasing the grain boundary fraction in the thin-film-type high-capacity dielectric layers.

The core-shell wall 1111c may be a wall that is located at the interface of the core 1111a and the shell 1111b and is formed due to excessive use of the minor component. The core-shell wall 1111c may be formed in the initial stage of mixing and baking the major component and the minor component since diffusion of the minor component to the major component surfaces uniformly progresses at a high concentration. After mixing and baking is performed such that diffusion of the minor component to the major component surfaces uniformly progresses at a high concentration, a liquid phase sintering step of the major component and the minor component and a solid phase sintering step by grain boundary migration may be performed, whereby dielectric grains having core-shell walls 1111c at the interfaces of the cores 1111a and the shells 1111b may be made.

As an example, the cores 1111a may contain a total amount of minor component equal to or smaller than 0.1 mol relative to 100 mol of the major component, and the shells 1111b may contain a total amount of minor component greater than 0.1 mol and equal to or smaller than 30.0 mol relative to 100 mol of the major component, or greater than 0.1 mol and equal to or smaller than 20.0 mol. When the cores 1111a contain more than 0.1 mol of the minor component relative to 100 mol of the major component, the material properties of the pure dielectric material (for example, $BaTiO_3$) may vary, and when the shells 1111b contain an amount of minor component equal to or smaller than 0.1 mol relative to 100 mol of the major component, the range of variation in the dielectric constant according to temperature may become wider, and when the shells contain more than 30.0 mol, the initial insulation resistance may decrease.

As an example, the core-shell walls 1111c may contain an amount of minor component greater than 2.0 mol and equal to or smaller than 30.0 mol relative to 100 mol of the major component. When the core-shell walls 1111c contain an amount of minor component greater than 2.0 mol and equal to or smaller than 30.0 mol relative to 100 mol of the major component, it is possible to effectively prevent degradation of the insulation resistance.

In other words, in the cores 1111a, the minor component may not exist, or if present, only a tiny amount may exist. Therefore, the cores 1111a may be composed of only the pure major component without impurities, and the pure major component may generally have a higher dielectric constant as compared to the major component doped with impurity elements. Accordingly, the cores 1111a may serve to maintain the dielectric constant.

The shells 1111b contain more minor component than the cores 1111a. In the shells 1111b, the minor component positioned at B-sites of the major component (a perovskite ($ABO_3$) structure) by doping has the effect of increasing the band gap energy at which other rare earths and doping elements diffuse into the dielectric grains 1111. Accordingly, the shells may serve as barriers for restraining other rare earth elements and doping elements from diffusing into the dielectric grains 1111. The shells 1111b may serve to suppress the growth of the dielectric grains 1111, thereby contributing to the atomization of the dielectric grains 1111. Further, in the shells 1111b, the minor component positioned at the A-sites of the major component by doping may serve to improve the reliability and the dielectric constant.

The core-shell walls 1111c contain the largest amount of minor component. Accordingly, similar to the grain boundaries, the core-shell walls may serve to suppress migration of electrons and ion carriers when voltage is applied to the capacitor, thereby preventing degradation of the insulation resistance.

In the multilayered capacitor according to the embodiment, when the average concentration of the minor component in the grain boundaries of the dielectric grains 1111 is denoted by $C_{GB}$ (at %), and the average concentration of the minor component at the core-shell walls 1111c is denoted by $C_{CS}$ (at %), $C_{CS}/C_{GB}$ is in a range from 0.40 to 0.75.

The average concentration $C_{GB}$ of the minor component in the grain boundaries between the dielectric grains 1111 may refer to the average concentration (at %) of the minor component relative to the major component contained in the grain boundaries, and the average concentration $C_{CS}$ (at %) of the minor component in the core-shell walls 1111c may refer to the average concentration (at %) of the minor component relative to the concentration of the major component contained in the core-shell walls 1111c.

When the above-mentioned range is satisfied, the dielectric constant of the capacitor is excellent, and degradation of the insulation resistance is effectively prevented. Therefore, it is possible to realize a multilayered capacitor with improved reliability.

Figure 9:
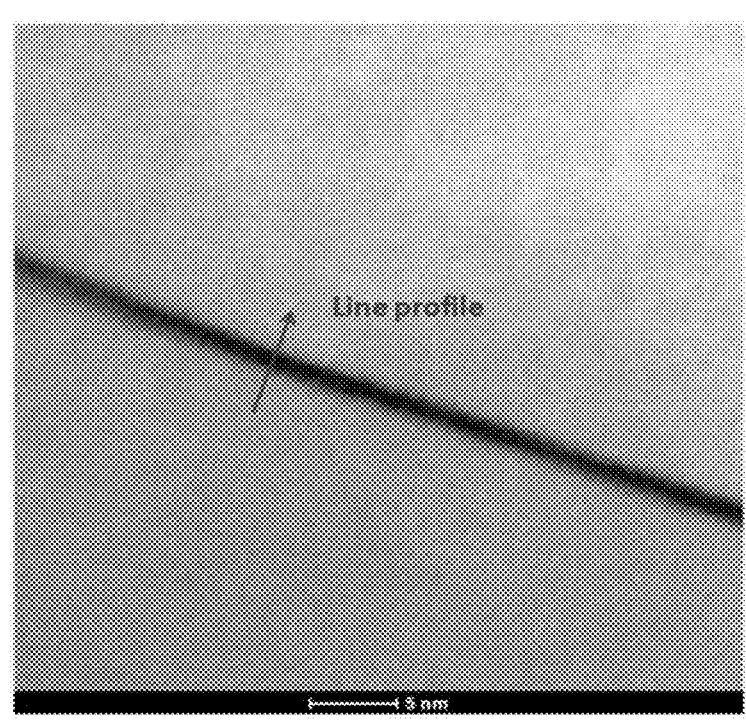
FIG. 9 is a TEM photo showing the line profile of a grain boundary.
Figure 10:
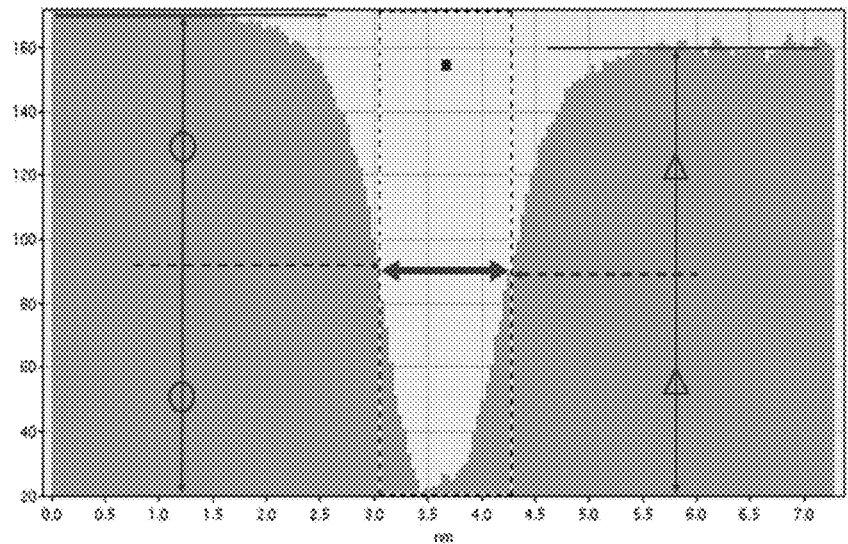
FIG. 10 is a graph for calculating the thickness of a grain boundary based on a contrast difference which is observed in the line profile of FIG. 9.

FIG. 9 is a TEM photo showing the line profile of a grain boundary, and FIG. 10 is a graph for calculating the thickness of a grain boundary based on a contrast difference which is observed in the line profile of FIG. 9 to accurately determine the grain boundary.

A method of measuring the average concentrations of the minor component in the grain boundaries and the core-shell walls 1111c will be described below with reference to FIG. 9 and FIG. 10.

First, thin film samples for transmission electron microscope (TEM) observation are made by FIB micro-sampling. Then, an Ar milling process is performed on the thin film samples, whereby scanning transmission electron microscope (STEM) samples with a thickness of about 80 nm for observing core-shell walls 1111c and grain boundaries are made.

Next, the probe diameter of an electron beam is set to about 0.5 nm or less, and analysis on core-shell walls 1111c and grain boundaries is performed. At this time, the analysis is performed only on core-shell walls 1111c and grain boundaries having no inclination with respect to an incident electron beam.

Referring to FIG. 9 and FIG. 10, the full widths at half maximum (FWHMs) of peaks shown in the line profiles of grain boundaries like HAADF-STEM images (magnification ×2.25) of grain boundaries are measured, and are defined as the thicknesses of the grain boundaries, and as a component analysis on the grain boundaries, a comparative analysis on regions having the same thickness is performed.

Further, the full widths at half maximum (FWHMs) of peaks shown in the line profiles of core-shell walls 1111c are measured, and are defined as the thicknesses of the core-shell walls, and as a component analysis on the core-shell walls 1111c, a comparative analysis on regions having the same thickness is performed.

Furthermore, a component analysis on grain boundaries may be performed by performing an EDS analysis by irradiating one point of a layer with an electron beam under a condition in which grain boundaries have no inclination and the probe diameter satisfies the above-mentioned condition. At this time, the measurement is performed at 20 points of each sample, and the average is calculated.

In addition, a component analysis on core-shell walls 1111c may be performed by performing an EDS analysis by irradiating one point of a layer with an electron beam under a condition in which core-shell walls 1111c have no inclination and the probe diameter satisfies the above-mentioned condition. At this time, the measurement is performed at 20 points of each sample, and the average is calculated.

In the embodiment, the average diameter of the dielectric grains 1111 may be in a range from 120 nm to 200 nm, and the average diameter of the cores 1111a may be in a range from 100 nm to 150 nm.

The ratio of the average diameter of the dielectric grains 1111 to the average diameter of the cores 1111a may be in a range from 1.2 to 1.8. When the above-mentioned range is satisfied, the dielectric constant of the capacitor is excellent, and degradation of the insulation resistance is effectively prevented. Therefore, it is possible to realize a multilayered capacitor with improved reliability.

The average diameter of the dielectric grains 1111 and the average diameter of the cores 1111a are measured by the following method.

As an example, a cross section sample is prepared by putting the multilayered capacitor 100 in an epoxy mixture, curing it, polishing an L-axis direction-T-axis direction side surface of the capacitor body 110 half way in the W-axis direction, fixing and keeping it in a vacuum atmosphere chamber, and cutting the center of the capacitor body 110 in the W-axis direction along the L-axis direction and the T-axis direction.

Next, the cross section sample is etched using a 0.2% hydrofluoric acid solution and a 1% nitric acid solution for about 10 seconds, and a scanning electron microscope (SEM) image is prepared.

In the SEM image, an arbitrary dielectric layer 111 is selected at the center point in the length direction (L-axis direction) or the width direction (W-axis direction), and the diameters of dielectric grains 1111 and the diameters of cores 1111a are measured. At this time, as the diameter of a dielectric grain 1111 or the diameter of a core 1111a, the average of the length of the longest major axis and the length of the longest minor axis among minor axes orthogonal to the longest major axis may be calculated. Further, more than 500 dielectric grains may be selected from the same dielectric layer, and the diameters of the dielectric grains 1111 and the diameters of the cores 1111a may be measured, and the averages may be calculated.

In the embodiment, the ratio of the average number of dielectric grains including core-shell walls 1111c to the average number of dielectric grains 1111 may be 70% or more, for example, 75% or more, or 80% or more.

When the ratio of the average number of dielectric grains including core-shell walls 1111c to the average number of dielectric grains 1111 is 70% or more, when voltage is applied, the core-shell walls 1111c can suppress migration of electrons and ion carriers, thereby effectively suppressing degradation of the insulation resistance.

The ratio of the average number of dielectric grains including core-shell walls 1111c to the average number of dielectric grains 1111 may be measured by the following method.

First, an arbitrary dielectric layer 111 is selected from a scanning electron microscope (SEM) image of the above-mentioned cross section sample, and an area of the active region having a size of 1 μm×1 μm (unit area) is set as a measurement object, and the number of dielectric grains 1111 and the number of dielectric grains including core-shell walls 1111c in the unit area are measured.

As an example, in a scanning electron microscope (SEM) image obtained as shown in FIG. 6 by observing dielectric grains in a dielectric layer with a scanning electron microscope, dielectric grains including core-shell walls 1111c are marked as shown in FIG. 7, and in such an image, the number of dielectric grains 1111 and the number of dielectric grains including core-shell walls 1111c may be measured.

Further, each of the averages of the numbers of dielectric grains 1111 and the numbers of dielectric grains including core-shell walls 1111c may be the arithmetic average of three values measured from three different dielectric layers 111 in the cross section taken along the L-axis direction and the T-axis direction, or may be the arithmetic average of a total of nine values measured at the center, one end, and the other end of the active region in three different dielectric layers 111 in the cross section taken along the L-axis direction and the T-axis direction.

As an example, the average thickness of the dielectric layers 111 may be equal to or greater than 0.05 μm, 0.1 μm, or 0.2 μm, and may be equal to or smaller than 0.5 μm or 0.4 μm.

When the average thickness of the dielectric layers 111 is smaller than 0.05 μm, it may be difficult to confirm the improvement of reliability.

The average thickness of the dielectric layers 111 may be the arithmetic average of the thicknesses of the dielectric layers 111 at 10 points at predetermined intervals from a reference point in a scanning electron microscope (SEM) image of the cross section sample when the center point of the dielectric layers 111 in the length direction (L-axis direction) or the width direction (W-axis direction) is set as the reference point. The intervals between the 10 points may be adjusted according to the scale of the SEM image, and may be, for example, an interval of 1 μm to 100 μm, 1 μm to 50 μm, or 1 μm to 10 μm. In this case, all 10 points should be located within the dielectric layers 111, and when all 10 points are not located within the dielectric layers 111, the position of the reference point may be changed or the interval of 10 points may be adjusted.

The first internal electrodes 121 and the second internal electrodes 122 are electrodes with different polarities, and may be alternately disposed along the T-axis direction such that a first internal electrode and a second internal electrode adjacent to each other with a dielectric layer 111 interposed therebetween face each other, and one end of each internal electrode may be exposed from the third and fourth surfaces of the capacitor body 110.

The first internal electrodes 121 and the second internal electrodes 122 may be electrically insulated from each other by the dielectric layers 111 disposed therebetween.

The end portions of the first internal electrodes 121 and the second internal electrodes 122 that are alternately exposed from the third and fourth surfaces of the capacitor body 110 may be electrically coupled to the first external electrode 131 and the second external electrode 132, respectively.

The first internal electrodes 121 and the second internal electrodes 122 may contain a conductive metal, and may contain a metal such as Ni, Cu, Ag, Pd, Au, or the like, or an alloy thereof such as an Ag—Pd alloy.

Also, the first internal electrodes 121 and the second internal electrodes 122 may contain dielectric particles of the same composition system as that of the ceramic material that is contained in the dielectric layers 111.

The first internal electrodes 121 and the second internal electrodes 122 may be formed using conductive paste containing a conductive metal. The printing method of the conductive paste may use a screen printing method, a gravure printing method, or the like.

As an example, the average thicknesses of the first internal electrodes 121 and the second internal electrodes 122 may be equal to or larger than 0.05 µm, 0.1 µm, 0.2 µm, or 0.25 µm, and may be equal to or smaller than 0.5 µm, 0.4 µm, or 0.37 µm.

The average thickness of the first internal electrodes 121 or the second internal electrodes 122 may be the arithmetic average of the thicknesses of the first internal electrodes 121 or the second internal electrodes 122 at 10 points at predetermined intervals from a reference point in a scanning electron microscope (SEM) image of the cross section sample when the center point of the first internal electrodes 121 or the second internal electrodes 122 in the length direction (L-axis direction) or the width direction (W-axis direction) is set as the reference point. The intervals between the 10 points may be adjusted according to the scale of the SEM image, and may be, for example, an interval of 1 µm to 100 µm, 1 µm to 50 µm, or 1 µm to 10 µm. In this case, all 10 points should be located within the first internal electrode 121 or the second internal electrode layer 122, and when all 10 points are not located within the first internal electrode 121 or the second internal electrode layer 122, the position of the reference point may be changed or the interval of 10 points may be adjusted.

The first external electrode 131 and the second external electrode 132 may receive voltages of different polarities, and may be electrically coupled to the exposed portions of the first internal electrodes 121 and the second internal electrodes 122, respectively.

According to the above configuration, when a predetermined voltage is applied between the first external electrode 131 and the second external electrode 132, charge is accumulated between the first internal electrodes 121 and the second internal electrodes 122 facing each other. At this time, the capacitance of the multilayered capacitor 100 becomes proportional to the overlapped area of the first internal electrodes 121 and the second internal electrodes 122 overlapping each other along the T-axis direction in the active region.

The first external electrode 131 and the second external electrode 132 may be disposed on the third and fourth surfaces of the capacitor body 110, respectively, and may include first and second connection portions, respectively, that are coupled to the first internal electrodes 121 and the second internal electrodes 122, respectively, and include first and second band portions, respectively, that are disposed at the edges where the third and fourth surfaces of the capacitor body 110 meet either the first and second surfaces or the fifth and sixth surfaces.

The first and second band portions may extend from the first and second connection portions to some points of either the first and second surfaces or fifth and sixth surfaces of the capacitor body 110. The first and second band portions may serve to improve the adhesion strength of the first external electrode 131 and the second external electrode 132.

As an example, each of the first external electrode 131 and the second external electrode 132 may include a sintered metal layer that is in contact with the capacitor body 110, a conductive resin layer that is disposed to cover the sintered metal layer, and a plating layer that is disposed to cover the conductive resin layer.

The sintered metal layer may contain a conductive metal and glass.

As an example, the sintered metal layer may contain, as the conductive metal, copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, copper (Cu) may contain a copper (Cu) alloy. When the conductive metal contains copper, metals other than copper may be contained in the amount of 5 mol or less relative to 100 mol of copper.

As an example, the sintered metal layer may contain a composition containing oxides as glass, and may contain, for example, one or more selected from a group consisting of silicon oxides, boron oxides, aluminum oxides, transition metal oxides, alkali metal oxides, and alkaline earth metal oxides. The transition metals may include zinc (Zn), titanium (Ti), copper (Cu), vanadium (V), manganese (Mn), iron (Fe), and nickel (Ni), or a combination thereof. The alkali metals may include lithium (Li), sodium (Na), and potassium (K), or a combination thereof. The alkaline earth metals may include magnesium (Mg), calcium (Ca), strontium (Sr), and barium (Ba), or a combination thereof.

Selectively, the conductive resin layer may be formed on the sintered metal layer, and may be formed, for example, so as to completely cover the sintered metal layer. Meanwhile, the first external electrode 131 and the second external electrode 132 may not include the sintered metal layers, and in this case, the conductive resin layers may be in direct contact with the capacitor body 110.

The conductive resin layers may extend to the first and second surfaces or fifth and sixth surfaces of the capacitor body 110, and the lengths of regions (i.e., band portions) where the conductive resin layers extend to the first and second surfaces or fifth and sixth surfaces of the capacitor body 110 may be longer than the lengths of regions (i.e., band portions) where the sintered metal layers extend in the first and second surfaces or fifth and sixth surfaces of the capacitor body 110. In other words, the conductive resin layers may be formed on the sintered metal layers, and may be formed so as to completely cover the sintered metal layers.

The conductive resin layers contain a resin and a conductive metal.

The resin which is contained in the conductive resin layers is not particularly limited as long as it has a bonding property and an impact absorption property and can be mixed with conductive metal powder to form a paste, and may contain, for example, a phenolic resin, an acrylic resin, a silicon resin, an epoxy resin, or a polyimide resin.

The conductive metal that is contained in the conductive resin layers serves to electrically connect the first internal electrodes 121 and the second internal electrodes 122 to the sintered metal layers.

The conductive metal that is contained in the conductive resin layers may have a spherical shape, a flake shape, or a combination thereof. In other words, the conductive metal may be formed only in a flake shape, or may be formed only in a spherical shape, or may be the form of a mixture of a flake shape and a spherical shape.

Here, the spherical shape may include a shape which is not fully spherical, and may include, for example, a shape in which the ratio of the length of the long axis to the length of the short axis ([Long Axis]/[Short Axis]) is 1.45 or less. Flake-type powder may refer to powder having a flat, elongated shape, but is not particularly limited, and may be, for example, a shape in which the ratio of the length of the long axis to the length of the short axis ([Long Axis]/[Short Axis]) is 1.95 or greater.

The first external electrode 131 and the second external electrode 132 may further include plating layers that are disposed on the outer sides of the conductive resin layers.

The plating layers may contain one of nickel (Ni), copper (Cu), tin (Sn), palladium (Pd), platinum (Pt), gold (Au), silver (Ag), tungsten (W), titanium (Ti), lead (Pb), etc., or an alloy thereof. As an example, each plating layer may be a nickel (Ni) plating layer or a tin (Sn) plating layer, or may be a form in which a nickel (Ni) plating layer and a tin (Sn) plating layer are sequentially stacked, or may be a form in which a tin (Sn) plating layer, a nickel (Ni) plating layer, and a tin (Sn) plating layer are sequentially stacked. Alternatively, each plating layer may include a plurality of nickel (Ni) plating layers and/or a plurality of tin (Sn) plating layers.

The plating layers can improve the mounting characteristics of the multilayered capacitor 100 to a substrate, and the structural reliability, the resistance to the outside, the heat resistance, and equivalent series resistance (ESR) of the multilayered capacitor.

Hereinafter, specific Examples of the invention will be presented. However, the following Examples are intended only to specifically illustrate or describe the invention, and should not be construed as limiting the scope of the invention.

EXAMPLES

To dielectric raw-material powder containing barium titanate ($BaTiO_3$) powder having an average particle diameter of 100 nm as a parent-material powder major-component, as minor components, 1.5 mol of $Dy_2O_3$, 0.2 mol of $Mn_3O_4$, 0.2 mol of $V_2O_5$, 0.6 mol of $BaCO_3$, 1.5 mol of $SiO_2$, 0.7 mol of $MgCO_3$, and 0.5 mol of $Al_2O_3$ relative to 100 mol of the major component are added. To the mixture, a binder, an organic solvent such as ethanol/toluene, and zirconia balls are added, and are blended in a wet manner, whereby slurry for a dielectric is produced.

The produced slurry for a dielectric is used to produce dielectric green sheets with a thickness of about 0.6 μm with a head discharge type on-roll forming coater.

On the surfaces of the dielectric green sheets, conductive paste layers containing nickel (Ni) are printed, and the dielectric green sheets with the conductive paste layers are stacked and pressed, whereby a dielectric green sheet laminate is produced. Then, the laminate is pressed and cut.

Thereafter, the cut laminates are heated to remove binder, and then are baked in a high-temperature reducing atmosphere, whereby ceramic bodies are formed. In the baking process, baking is performed at a temperature of 1050° C. to 1250° C. in a reducing atmosphere ($H_2O/H_2/N_2$ atmosphere, 0.1% $H_2$/99.9% $N_2$) for 1 hour, and then a thermal treatment is performed by performing reoxidation at 1000° C. in a nitrogen ($N_2$) atmosphere for 3 hours. At this time, the baking is performed while the average diameter of dielectric grain cores and the ratio of the average diameter of cores to the average diameter of dielectric grains are adjusted as shown in Table 1, such that in the early stage of the baking, the diffusion of the minor components to the major component surfaces uniformly progresses at a high concentration.

Furthermore, in a cooling process, cooling is performed at a high speed, such that the average diameter of dielectric grains in the dielectric layers is adjusted so as to fall in a range from 120 nm to 200 nm.

Next, external electrodes are formed of copper (Cu) paste on the baked ceramic bodies through a termination process and electrode baking, whereby multilayered capacitors according to Example 1 in which the thicknesses of dielectric layers are about 0.4 μm and the thicknesses of internal electrodes are about 0.37 μm are produced.

Multilayered capacitors of Examples 1 to 3 and Comparative Examples 1 to 6 different from one another in (1) the average diameter of cores and (2) the ratio of the average diameter of cores to the average diameter of dielectric grains are produced and are shown in the following Table 1.

Experimental Examples

Experimental Example 1: $C_{CS}/C_{GB}$ Analysis

With respect to the multilayered capacitors of Examples 1 to 3 and Comparative Examples 1 to 6, first, thin film samples for transmission electron microscope (TEM) observation are made by FIB micro-sampling. Then, an Ar milling process is performed on the thin film samples, whereby scanning transmission electron microscope (STEM) samples with a thickness of about 80 nm for observing core-shell walls and grain boundaries are made.

Next, the probe diameter of an electron beam is set to about 0.5 nm or less, and analysis on core-shell walls and grain boundaries is performed. At this time, the analysis is performed only on core-shell walls and grain boundaries having no inclination with respect to an incident electron beam.

Referring to FIG. 9 and FIG. 10, the full widths at half maximum (FWHMs) of peaks shown in the line profiles of grain boundaries like HAADF-STEM images (magnification ×2.25) of grain boundaries are measured, and are defined as the thicknesses of the grain boundaries, and as a component analysis on the grain boundaries, a comparative analysis on regions having the same thickness is performed.

Further, the full widths at half maximum (FWHMs) of peaks shown in the line profiles of core-shell walls 1111c are measured, and are defined as the thicknesses of the core-shell walls 1111c, and as a component analysis on the core-shell walls 1111c, a comparative analysis on regions having the same thickness is performed.

Furthermore, a component analysis on grain boundaries may be performed by performing an EDS analysis by irradiating one point of a layer with an electron beam under a condition in which grain boundaries have no inclination and the probe diameter satisfies the above-mentioned condition. At this time, the measurement is performed at 20 points of each sample, and the average is calculated.

In addition, a component analysis on core-shell walls 1111c may be performed by performing an EDS analysis by irradiating one point of a layer with an electron beam under a condition in which core-shell walls 1111c have no inclination and the probe diameter satisfies the above-mentioned condition. At this time, the measurement is performed at 20 points of each sample, and the average is calculated.

Through this, each of $C_{GB}$ (at %) that is the average concentration of the minor components in the grain boundaries and $C_{CS}$ (at %) that is the average concentration of the minor components in the core-shell walls 1111c is measured, and the values of $C_{CS}/C_{GB}$ are shown in (3) of the following Table 1.

Experimental Example 2: Analysis of Ratio of Average Diameter of Cores to Average Diameter of Dielectric Grains Cross section samples are prepared by putting the multi-layered capacitors of Examples 1 to 3 and Comparative Examples 1 to 6 in an epoxy mixture curing it, polishing an L-axis direction-T-axis direction side surface of the capacitor body half way in the W-axis direction, fixing and keeping it in a vacuum atmosphere chamber, and cutting the center of the capacitor body in the W-axis direction along the L-axis direction and the T-axis direction.

Next, the cross section samples are etched using a 0.2% hydrofluoric acid solution and a 1% nitric acid solution for about 10 seconds, and scanning electron microscope (SEM) images are prepared.

In the SEM images, arbitrary dielectric layers 111 are selected at the center points in the length direction (L-axis section samples are prepared, and arbitrary dielectric layers are selected, and areas of the active regions having a size of 1 μm×1 μm (unit area) are set as measurement objects, and the numbers of dielectric grains and the numbers of dielectric grains including core-shell walls in the unit areas are measured.

Then, the averages of the numbers of dielectric grains and the numbers of dielectric grains including core-shell walls are obtained and are shown in (4) of the following Table 1.

Experimental Example 4: Evaluation of Reliability of Multilayered Capacitors With respect to the capacitors of each of Examples 1 to 3 and Comparative Examples 1 to 6, 400 samples are taken, and whether the samples are maintained without failure at 125° C. under a condition of 10V for 10 hours or more is evaluated, and when the samples are maintained, the reliability is determined to be OK, and is denoted by 'O' in (5) of the following Table 1, and when the samples fail, the reliability is determined to be not good, and is denoted by 'X' in (5) of the following Table 1

TABLE 1

| Category | (1) Average Diameter of Cores (nm) | (2) Ratio of Average Diameter of Dielectric Grains to Average Diameter of Cores | (3) $C_{CS}/C_{GB}$ | (4) Ratio of Average Number of Dielectric Grains containing Core-Shell Walls (%) | (5) Reliability Evaluation |
|---|---|---|---|---|---|
| Comparative Example 1 | 80 | 2.8 | 0.92 | 50 | X |
| Comparative Example 2 | 110 | 1.2 | 0.38 | 50 | X |
| Comparative Example 3 | 120 | 1.3 | 0.80 | 60 | X |
| Example 1 | 120 | 1.2 | 0.40 | 85 | ○ |
| Example 2 | 120 | 1.5 | 0.57 | 80 | ○ |
| Example 3 | 150 | 1.8 | 0.75 | 70 | ○ |
| Comparative Example 4 | 140 | 2.0 | 0.85 | 65 | X |
| Comparative Example 5 | 200 | 1.2 | 0.31 | 90 | X |
| Comparative Example 6 | 200 | 1.5 | 0.42 | 80 | X | direction) or the width direction (W-axis direction), and the diameters of dielectric grains and the diameters of cores are measured.

At this time, as the diameter of a dielectric grain or the diameter of a core, the average of the length of the longest major axis and the length of the longest minor axis among minor axes orthogonal to the longest major axis may be calculated.

Further, more than 500 dielectric grains are selected from the same dielectric layer, and the diameters of the dielectric grains and the diameters of the cores are measured, and the averages are calculated. Then, the ratio of the average diameter of the cores to the average diameter of the dielectric grains is obtained and is shown in (2) of the following Table 1.

Experimental Example 3: Analysis of Ratio (%) of Average Number of Dielectric Grains including Core-Shell Walls With respect to the multilayered capacitors of Examples 1 to 3 and Comparative Examples 1 to 6, scanning electron microscope (SEM) images of the above-mentioned cross Referring to Table 1, in the case of the multilayered capacitors of Examples 1 to 3, the values of $C_{CS}/C_{GB}$ are in a range from 0.40 to 0.75, and the ratios of the average diameters of dielectric grains to average diameters of the cores are in a range from 1.2 to 1.8, and the ratios of the average numbers of dielectric grains including core-shell walls are equal to or greater than 70%. Therefore, it is possible to see that the reliability of the capacitors is better than that of comparative examples.

While this invention has been described in connection with what is presently considered to be practical Examples, it is to be understood that the invention is not limited to the disclosed Examples. On the contrary, it is intended to cover various modifications and equivalent arrangements included within the spirit and scope of the appended claims.

DESCRIPTION OF SYMBOLS

100: Multilayered capacitor
110: Capacitor body
111: Dielectric layer
1111: Dielectric grain
1111a: Core of dielectric grain 1111b: Shell of dielectric grain
1111c: Core-shell barrier of dielectric grain
112, 113: Cover region
121: First internal electrode
122: Second internal electrode
131: First external electrode
132: Second external electrode

What is claimed is:

1. A multilayered capacitor comprising:
a capacitor body that includes a dielectric layer and an internal electrode; and
an external electrode disposed on an outer surface of the capacitor body,
wherein the dielectric layer contains a plurality of dielectric grains containing a major component and a minor component, and
at least one of the plurality of dielectric grains has a core-shell structure including a core, a shell, and a core-shell wall positioned between the core and the shell, and
between at least two dielectric grains of the plurality of dielectric grains, a grain boundary is included, and
when an average concentration (at %) of the minor component in the grain boundary is denoted by $C_{GB}$ and an average concentration of the minor component in the core-shell wall is denoted by $C_{CS}$, $C_{CS}/C_{GB}$ is in a range from 0.40 to 0.75.

2. The multilayered capacitor of claim 1, wherein, among the at least one of the plurality of dielectric grains, a ratio of an average diameter of a dielectric grain to an average diameter of the core is in a range from 1.2 to 1.8.

3. The multilayered capacitor of claim 2, wherein, among the plurality of dielectric grains, a ratio of an average number of the dielectric grains including the core-shell wall to an average number of the dielectric grains is equal to or greater than 70%.

4. The multilayered capacitor of claim 2, wherein, among the plurality of dielectric grains, the average diameter of the dielectric grain is in a range from 120 nm to 200 nm.

5. The multilayered capacitor of claim 2, wherein the average diameter of the core is in a range from 100 nm to 150 nm.

6. The multilayered capacitor of claim 2, wherein the average thickness of the dielectric layer is in a range from 0.05 μm to 0.5 μm.

7. The multilayered capacitor of claim 2, wherein the average thickness of the internal electrode is in a range from 0.05 μm to 0.5 μm.

8. The multilayered capacitor of claim 2, wherein the major component contains BaTiO3, Ba(Ti, Zr)O$_3$, Ba (Ti, Sn)O$_3$, (Ba, Ca)TiO$_3$, (Ba, Ca)(Ti, Zr)O$_3$, (Ba, Ca)(Ti, Sn)O$_3$, (Ba, Sr)TiO$_3$, (Ba, Sr)(Ti, Zr)O$_3$, (Ba, Sr)(Ti, Sn)O$_3$, or a combination thereof.

9. The multilayered capacitor of claim 2, wherein the minor component contains dysprosium (Dy), vanadium (V), manganese (Mn), chromium (Cr), silicon (Si), aluminum (Al), magnesium (Mg), tin (Sn), anti-mony (Sb), germanium (Ge), gallium (Ga), indium (In), barium (Ba), or a combination thereof.

10. The multilayered capacitor of claim 2, wherein
the core-shell wall contains an amount of the minor component greater than 2.0 mol and equal to or smaller than 30.0 mol relative to 100 mol of the major component,
the shell contains an amount of the minor component greater than 0.1 mol and equal to or smaller than 30.0 mol relative to 100 mol of the major component, and
the core contains an amount of the minor component equal to or smaller than 0.1 mol relative to 100 mol of the major component.

11. The multilayered capacitor of claim 1, wherein among the plurality of dielectric grains, a ratio of an average number of the dielectric grains including the core-shell wall to an average number of the dielectric grains is equal to or greater than 70%.

12. The multilayered capacitor of claim 1, wherein, among the plurality of dielectric grains, an average diameter of a dielectric grain is in a range from 120 nm to 200 nm.

13. The multilayered capacitor of claim 1, wherein, among the plurality of dielectric grains, an average diameter of the core is in a range from 100 nm to 150 nm.

14. The multilayered capacitor of claim 1, wherein
an average thickness of the dielectric layer is in a range from 0.05 μm to 0.5 μm.

15. The multilayered capacitor of claim 1, wherein
an average thickness of the internal electrode is in a range from 0.05 μm to 0.5 μm.

16. The multilayered capacitor of claim 1, wherein
the major component contains BaTiO$_3$, Ba(Ti, Zr)O$_3$, Ba (Ti, Sn)O$_3$, (Ba, Ca)TiO$_3$, (Ba, Ca)(Ti, Zr)O$_3$, (Ba, Ca)(Ti, Sn)O$_3$, (Ba, Sr)TiO$_3$, (Ba, Sr)(Ti, Zr)O$_3$, (Ba, Sr)(Ti, Sn)O$_3$, or a combination thereof.

17. The multilayered capacitor of claim 1, wherein
the minor component contains dysprosium (Dy), vanadium (V), manganese (Mn), chromium (Cr), silicon (Si), aluminum (Al), magnesium (Mg), tin (Sn), antimony (Sb), germanium (Ge), gallium (Ga), indium (In), barium (Ba), or a combination thereof.

18. The multilayered capacitor of claim 1, wherein
the core-shell wall contains an amount of the minor component greater than 2.0 mol and equal to or smaller than 30.0 mol relative to 100 mol of the major component.

19. The multilayered capacitor of claim 1, wherein
the shell contains an amount of the minor component greater than 0.1 mol and equal to or smaller than 30.0 mol relative to 100 mol of the major component, and
the core contains an amount of the minor component equal to or smaller than 0.1 mol relative to 100 mol of the major component.

20. The multilayered capacitor of claim 1, wherein the core-shell wall comprises a portion at an interface between the core and the shell where a molar ratio of the minor component relative to the major component is highest.

* * * * *